United States Patent
Raley et al.

(10) Patent No.: US 11,510,007 B2
(45) Date of Patent: Nov. 22, 2022

(54) MICROPHONE ADAPTER FOR WIRELESS AUDIO SYSTEMS

(71) Applicant: PRA Audio Systems, Inc., Lawrenceville, GA (US)

(72) Inventors: K. Paul Raley, Lawrenceville, GA (US); R. Mark Krikorian, Alpharetta, GA (US)

(73) Assignee: PRA Audio Systems, Inc., Lawrenceville, GA (US)

( * ) Notice: Subject to any disclaimer, the term of this patent is extended or adjusted under 35 U.S.C. 154(b) by 0 days.

(21) Appl. No.: 17/173,609

(22) Filed: Feb. 11, 2021

(65) Prior Publication Data
US 2021/0258689 A1   Aug. 19, 2021

Related U.S. Application Data

(63) Continuation-in-part of application No. 17/065,791, filed on Oct. 8, 2020.

(60) Provisional application No. 62/977,613, filed on Feb. 17, 2020.

(51) Int. Cl.
| | |
|---|---|
| *H04R 5/04* | (2006.01) |
| *H04R 3/12* | (2006.01) |
| *H04R 27/00* | (2006.01) |
| *G06F 3/16* | (2006.01) |

(52) U.S. Cl.
CPC ............... *H04R 5/04* (2013.01); *G06F 3/162* (2013.01); *H04R 3/12* (2013.01); *H04R 27/00* (2013.01); *H04R 2420/07* (2013.01); *H04R 2420/09* (2013.01)

(58) Field of Classification Search
CPC . H04R 1/028; H04R 1/04; H04R 3/12; H04R 5/04; H04B 7/155; H04B 7/15507; H04W 36/18
See application file for complete search history.

(56) References Cited

U.S. PATENT DOCUMENTS

2021/0112323 A1    4/2021  Raley

OTHER PUBLICATIONS

PurePath™ Wireless 2.4 GHz for wireless digital audio streaming supporting up to 2 channels. Data sheet. Texas Instrument. Jun. 2012, online <https://www.ti.com/product/CC8520> (Year: 2012).*

(Continued)

*Primary Examiner* — Nader Bolourchi
(74) *Attorney, Agent, or Firm* — Taylor English Duma LLP

(57) ABSTRACT

A microphone adapter connects to and receives analog audio input from a microphone and an external music source, such as a smart phone. The microphone audio input signal and external music audio input signal are converted to digital signals and multiplexed into a digital wireless signal that may be transmitted directly to multiple speakers. The digital wireless signals are uncompressed, high definition digital audio signals transmitted in the 2.4 GHz band with a range of several hundred feet. The microphone adapter enables user to easily establish a pop-up public address system without the need for speaker cables, sound boards, mixers, and the like.

13 Claims, 11 Drawing Sheets

(56) References Cited

OTHER PUBLICATIONS

CC85xx Family User Guide (Rev. M). Texas Instruments. 2013. online https://www.ti.com/lit/pdf/swru250 (Year: 2013).*
PurePath™ Wireless Audio Texas Instrument. 4Q 2011. (Year: 2011).*
Raley, K. Paul; Non-Final Office Action for U.S. Appl. No. 17/065,791, filed Oct. 8, 2020, dated Mar. 11, 2022, 26 pgs.
Raley, K. Paul; Final Office Action for U.S. Appl. No. 17/065,791, filed Oct. 8, 2020, dated Sep. 7, 2022, 28 pgs.

* cited by examiner

MICROPHONE ADAPTER FOR WIRELESS AUDIO SYSTEMS

CROSS-REFERENCE TO RELATED APPLICATIONS

This application claims the benefit of provisional application 62/977,613, filed Feb. 17, 2020, and entitled "Microphone Adapter for Wireless Audio Systems," and is a continuation-in-part of U.S. patent application Ser. No. 17/065,791, filed Oct. 8, 2020, and entitled "Multi-Chip Modules for Wireless Audio Devices," which claims the benefit of provisional application 62/913,535, filed Oct. 10, 2019, and entitled "Integrated Circuits for Wireless Audio Devices," the disclosures of which are hereby incorporated by reference in their entirety.

TECHNICAL FIELD

This disclosure relates to wireless digital audio transmission. More specifically, this disclosure relates to wireless adapters for conventional microphones and to configurable integrated circuits for use in wireless digital audio devices, such as microphone adapters, transmitters, receivers, speakers and musical instruments.

BRIEF SUMMARY

The present disclosure relates to technologies associated with the wireless digital transmission of audio signals. According to some embodiments, integrated circuits, or multi-chip modules, can comprise a variety of components useful to receive, process, and transmit audio signals.

According to further embodiments, an audio integrated circuit is configurable so that a single device type may be configured by a user. The configuration may be pin-selectable, where the configuration allows the user to determine whether the audio device is configured as a transmitter or receiver, and whether it transmits or receives the left, right, or both channels of a stereo signal.

According to further embodiments, an audio integrated circuit may be configured to receive input in a variety of formats or from a variety of sources, and to send output signals in a variety of formats to a variety of receivers. Audio formats can include Inter-IC Sound (I2S), USB audio, analog audio, or other audio formats.

According to further embodiments, an audio integrated circuit may be integrated into a microphone adapter that plugs into a wired microphone in order to convert it into a wireless microphone.

According to further embodiments, a microphone adapter may combine the audio input from the microphone with music or other audio from an audio player (e.g., an mp3 player, smart phone, or tablet) by including a secondary audio input for receiving audio from the audio player, Various implementations described in the present disclosure can comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations can be realized and obtained by means of the systems, methods, and features particularly pointed out in the appended claims. These and other features will become more fully apparent from the following description and appended claims, or can be learned by the practice of such exemplary implementations as set forth hereinafter.

BRIEF DESCRIPTION OF THE DRAWINGS

In the following Detailed Description, references are made to the accompanying drawings, which form a part hereof, and show, by way of illustration, specific embodiments or examples. The features and components of the following figures are illustrated to emphasize the general principles of the present disclosure. The drawings herein are not drawn to scale. Like numerals represent like elements throughout the several figures.

DETAILED DESCRIPTION

Figure 1:
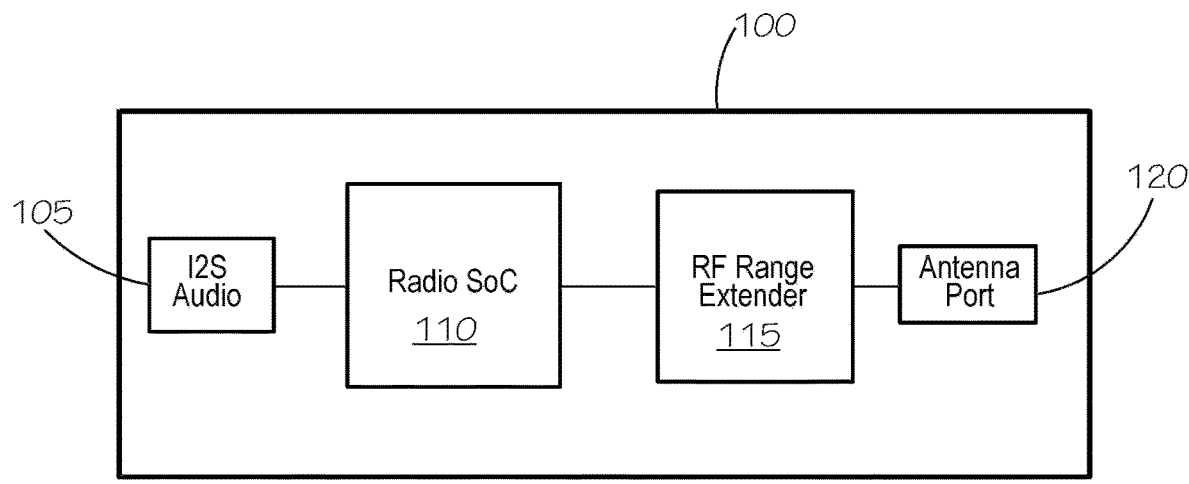
FIG. 1 is a block diagram of an audio integrated circuit for receiving I2S audio and transmitting it wirelessly via an antenna port, or vice versa; i.e., receiving audio wirelessly via an antenna port and making it available as I2S audio.

The present disclosure can be understood more readily by reference to the following detailed description, examples, drawings, and claims, and their previous and following descriptions. However, before the present devices, systems, and/or methods are disclosed and described, it is to be understood that this disclosure is not limited to the specific devices, systems, and/or methods disclosed unless otherwise specified, and as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

The following detailed description is directed to technologies and techniques associated with the digital wireless transmission of audio signals.

Wireless audio is very popular in many different settings. For example, wireless microphones are used by singers, actors, performers, and presenters in live performances and presentations. Musicians often use wireless transmitters (instead of cables) to transmit audio from their instruments to a sound board, peddle board, amplifier, computer, or other equipment. Many of these systems are analog, and experience problems common to analog audio systems, such as interference, static, distortion, limited range, and other problems.

Digital transmission of audio signals avoids some of the problems associated with the transmission of analog audio. Examples of digital audio transmission include Bluetooth-enabled speakers, headphones, automotive audio systems, and other systems and devices that are designed to play audio that is streamed from smartphones, tablets, and other digital devices over a Bluetooth connection. However, Bluetooth and other common digital systems also include features that limit their suitability for use with audio, and with high fidelity music in particular.

In most cases, digital audio is compressed in order to reduce the amount of data that must be transmitted or stored. Popular compression techniques include mp3 and Advanced Audio Coding (AAC). Both of these formats are lossy digital compression schemes and the process of compressing the digital signal, transmitting it, and then decompressing it results in audio that is not 100% true to the original audio source. Although it would be desirable to transmit uncompressed digital data, some digital systems, including Bluetooth systems, require that audio signals be compressed in some manner due to limitations on the data rates in those systems. Most people find this loss of fidelity to be undesirable, especially musicians and other audiophiles who demand accurate reproduction of music produced by their instruments or played on their audio systems.

Some versions of Wi-Fi (IEEE 802.11) have theoretical or maximum data rates in the hundreds of megabits per second, which is much faster than Bluetooth and could transport uncompressed digital audio signals. However, Wi-Fi, and other data-oriented transmission schemes introduce variable latencies. They also employ separate routers and require fairly complicated processes for setting up the network and adding devices to the network. They are also susceptible to interference from other devices, including appliances, HVAC systems, etc.

Additional considerations include range and the number of connections that are supported by the system. Bluetooth is typically reliable only up to about 30 feet and only connects to one speaker or headset at a time. The range of Wi-Fi depends on a variety of factors, but is typically in the range of 120 feet. Although many devices can connect to a Wi-Fi network, inconsistent latency characteristics render Wi-Fi less than ideal for connecting multiple speakers to a single audio source.

The ubiquity of systems and devices that wirelessly transmit audio using current technologies (such as Bluetooth, Wi-Fi, and analog systems) have made them very popular when compared to wired speakers, earbuds, and headphones, despite the problems discussed above.

In light of the popularity of wireless audio transmission and the shortcomings associated with current technologies and products, it is desirable to provide a wireless audio technology that is designed to deliver a consistent 24-bit High Definition (HD) digital audio signal with a range of up to 500 feet over its own dedicated, secure, easy-to-set-up, proprietary wireless network. This will eliminate the need for routers, extenders, separate applications, complicated set-ups, long network keys, pairing (and re-pairing) while also operating in an extremely secure way.

In addition, it would be desirable to add HD digital wireless capabilities to a variety of common audio devices, such as speakers, microphones, instrument pick-ups, smartphones, etc. This can be accomplished by incorporating HD digital wireless transmitters and receivers into the products themselves, or by providing adapters that would connect to existing or conventional audio products. In either case, it would be advantageous to eliminate the need for most discrete components and embody this technology in a single integrated circuit. In addition to advantages in terms of size, this also provides advantages such as lower power requirements, single voltage power supplies, reduced system noise, and improved radio frequency (RF) efficiency.

Generally speaking, an integrated circuit is a set of electronic circuits or components that are fabricated on a single, small piece of silicon or other semiconductor material. A silicon wafer contains hundreds or thousands of dies. Each die is a single copy of the circuit and may be as small as a few millimeters square. The dies are tested, separated, and packaged in a variety of ways that make them useful in electronic products.

In some cases, it is advantageous to combine the functions available in separate integrated circuits into a single integrated circuit. A multi-chip module is an electronic assembly where multiple integrated circuits, semiconductor dies, or other discrete components are integrated, usually onto a unifying substrate, so that it can be treated as if it were a larger IC. This type of device may also be referred to as a System-in-a-Package (SIP).

Those skilled in the art will appreciate that an end-user device or finished product that is capable of wirelessly transmitting and receiving high-fidelity audio signals may require a variety of inputs and outputs and a variety of features or functions.

For example, a product or device may receive or provide audio in a variety of formats. If the device receives or provides analog audio, it will need not only analog audio inputs and outputs, but an audio codec suitable for converting analog audio signals into digital audio signals, and vice versa. A suitable audio codec can be the Texas Instruments TLV320AIC3101 stereo audio codec or similar device. If the device is to receive or provide digital audio outputs (such as USB or Inter-IC (I2C) audio), it will not need an audio codec, but will need appropriate inputs and outputs.

A wireless, digital audio device will also require a radio or RF system on a chip (SoC) or other circuitry capable of converting or modulating the digital signal into a radio frequency (RF) signal suitable for transmission from the transmitter to the receiver, and for demodulating the signal at the receiver end. Such an integrated circuit can also provide frequency hopping, forward error correction, buffering, retransmission, etc. These features may be implemented or incorporated in such as was as to form a proprietary, wireless audio network. A suitable RF SoC can be the Texas Instruments CC8520/21/30/31 SoC for wireless digital audio streaming or similar device.

Depending on the output power of the radio SoC that is used and the desired output capabilities of the device, a wireless, digital audio device may also require an RF range extender in order to amplify the RF signal and increase the effective range of the device. A suitable RF range extender can be the Texas Instruments CC2592 2.4 GHz range extender or similar device.

A Wireless microcontroller unit (MCU) (also referred to as a wireless module) may also be employed if the device is to be capable of connecting to legacy wireless networks, such as Wi-Fi or Bluetooth, in addition to the proprietary, wireless audio network supported by the RF SoC and RF range extender. A suitable wireless module can be the Texas Instruments CC3200 SimpleLink single-chip wireless MCU or similar device.

Those skilled in the art will appreciate that a benefit of providing multi-chip modules that combine or incorporate the desired features (as opposed to employing separate, discrete components that implement each feature) is that transmitters and receivers capable to transmitting and receiving high-fidelity wireless audio signals may be smaller, less expensive, and more suitable for incorporation into audio products such as microphones, speakers, etc. Replacing discrete components with a multi-chip module offers additional advantages, including a single voltage power supply, improved RF efficiency, reduced system noise, reduced passive component count, and reduced system noise floor. These features can be increasingly important as governments or regulatory bodies impose stricter regulations on RF products.

An additional feature of the present disclosure is the use of pin-selectable logic, a boot loader, and non-volatile memory to allow devices to be user-configurable. By way of example, if a device has three two-position switches, they could be used to allow the user to choose up to eight different operating modes. The following table illustrates how switches can be set to configure the device to transmit right channel, receive right channel, transmit left channel, receive left channel, transmit both channels, or receive both channels.

| Switch 1: Xmit/Rcv | Switch 2: Right | Switch 3: Left | Mode |
|---|---|---|---|
| 0 | 0 | 0 | N/A |
| 0 | 0 | 1 | Receive left channel |
| 0 | 1 | 0 | Receive right channel |
| 0 | 1 | 1 | Receive both channels |
| 1 | 0 | 0 | N/A |
| 1 | 0 | 1 | Transmit left channel |
| 1 | 1 | 0 | Transmit right channel |
| 1 | 1 | 1 | Transmit both channels |

When the device boots up, it can read the switch settings and use those to determine which code the boot loader should read from the non-volatile memory. By providing this type of configurability, a manufacturer can inventory fewer different products since the same multi-chip module can be used for any of these modes or configurations.

Turning now to the drawings figures, several embodiments of the present invention will be described. In some aspects, the present invention features multi-chip modules that incorporate the features and functionality discussed above in various combinations in order to meet various design criteria and product requirements.

FIG. 1 is a block diagram of an audio multi-chip module 100 for receiving I2S digital audio and transmitting it wirelessly via an antenna port (e.g., a 50 ohm antenna port), or vice versa. The multi-chip module incorporates an I2S audio port 105, a radio SoC 110, and RF range extender 115, and an antenna port 120. When configured in transmit mode, an I2S digital audio signal would be input at the I2S audio port 105, processed by the radio SoC 110, processed by the RF range extender 115, and the resulting RF signal provided to the antenna port 120. When configured in receive mode, an RF signal would be received at the antenna port 120, processed by the range extender 115, processed by the radio SoC 110, and the resulting I2S digital audio signal provided to the I2S audio port 105.

Figure 2:
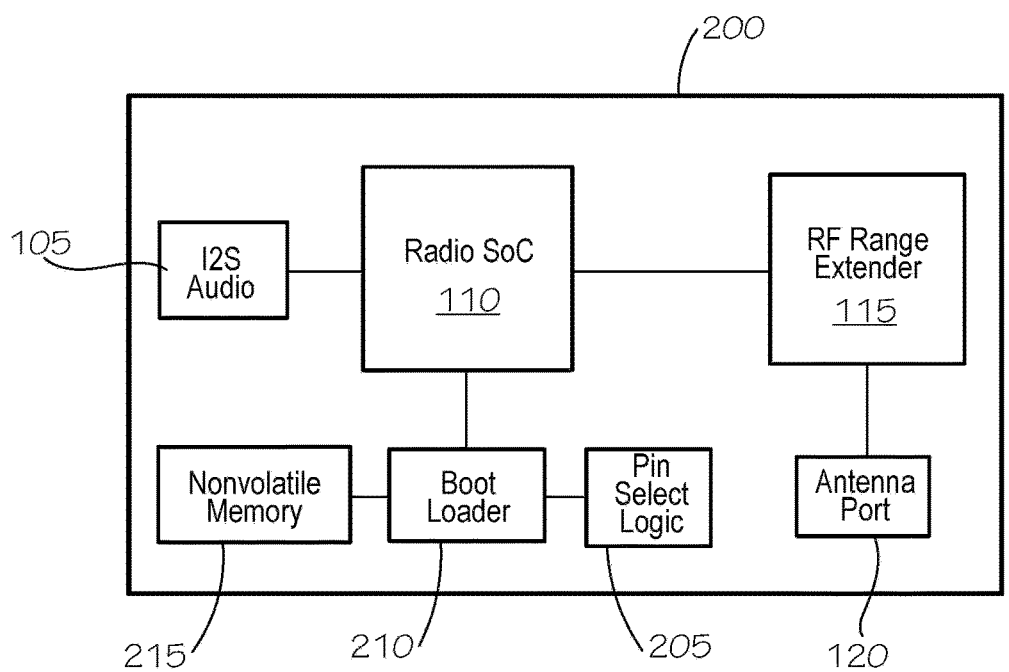
FIG. 2 is a block diagram of a configurable version of the audio integrated circuit of FIG. 1, where the integrated circuit is configured using pin select logic, a boot loader, and non-volatile memory.

FIG. 2 is a block diagram of a configurable version 200 of the audio multi-chip module of FIG. 1, where the multi-chip module 200 is configured using pin select logic 205, a boot loader 210, and non-volatile memory 215 similar to that described above. Once configured at start-up via the boot loader 210, the multi-chip module 200 would operate as described above in conjunction with FIG. 1.

Figure 3:
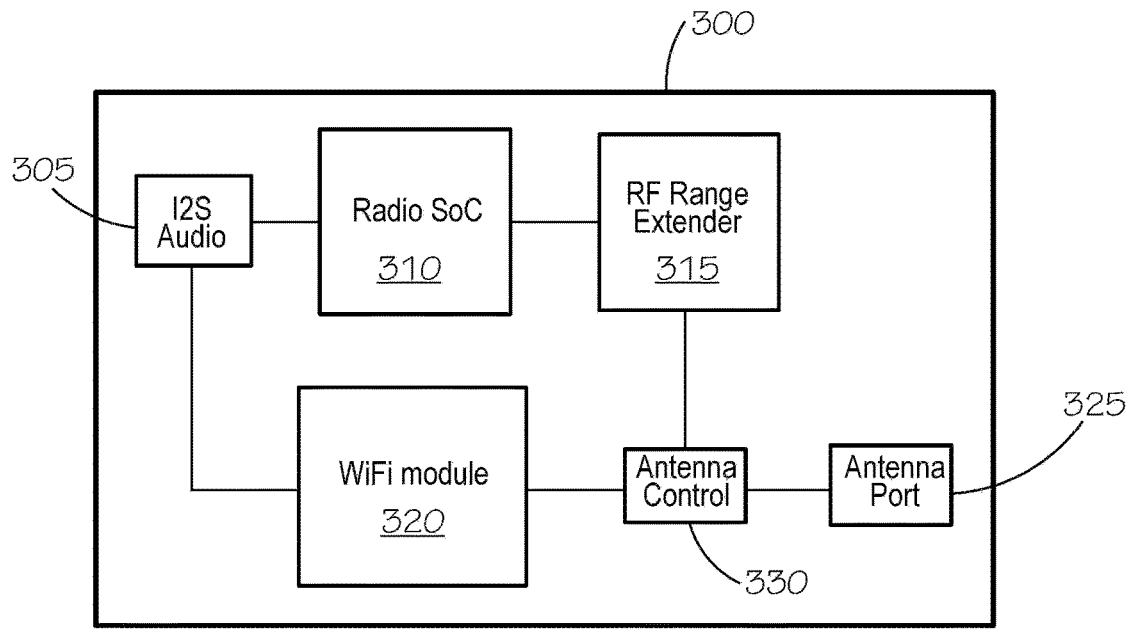
FIG. 3 is a block diagram of an audio integrated circuit for receiving I2S audio and transmitting it via one of two wireless networks (e.g., a proprietary wireless network, Wi-Fi, etc.), or vice versa; i.e., receiving audio wirelessly via one of two wireless networks and making it available as I2S audio.

FIG. 3 is a block diagram of an audio multi-chip module 300 for receiving I2S digital audio and transmitting it via one of two wireless networks, or vice versa. The multi-chip module 300 incorporates an I2S digital audio port 305, a radio SoC 310, an RF range extender 315, a Wi-Fi module 320, and an antenna port 325. An antenna control module 330 is used to determine which signal path has access to the antenna port 325. When configured in transmit mode, an I2S digital audio signal would be input at the I2S digital audio port 305. If the high-fidelity mode is selected, the signal will be processed by the radio SoC 310 and the RF range extender 315, and the resulting proprietary, wireless audio signal provided to the antenna port 325 via the antenna control 330. Alternatively, if the device is configured to connect wirelessly via Wi-Fi or other legacy network, the I2S signal will be processed by the Wi-Fi module 320 and provided to the antenna port 325 via the antenna control 330. When configured in receive mode, the signals would travel the reverse path.

Figure 4:
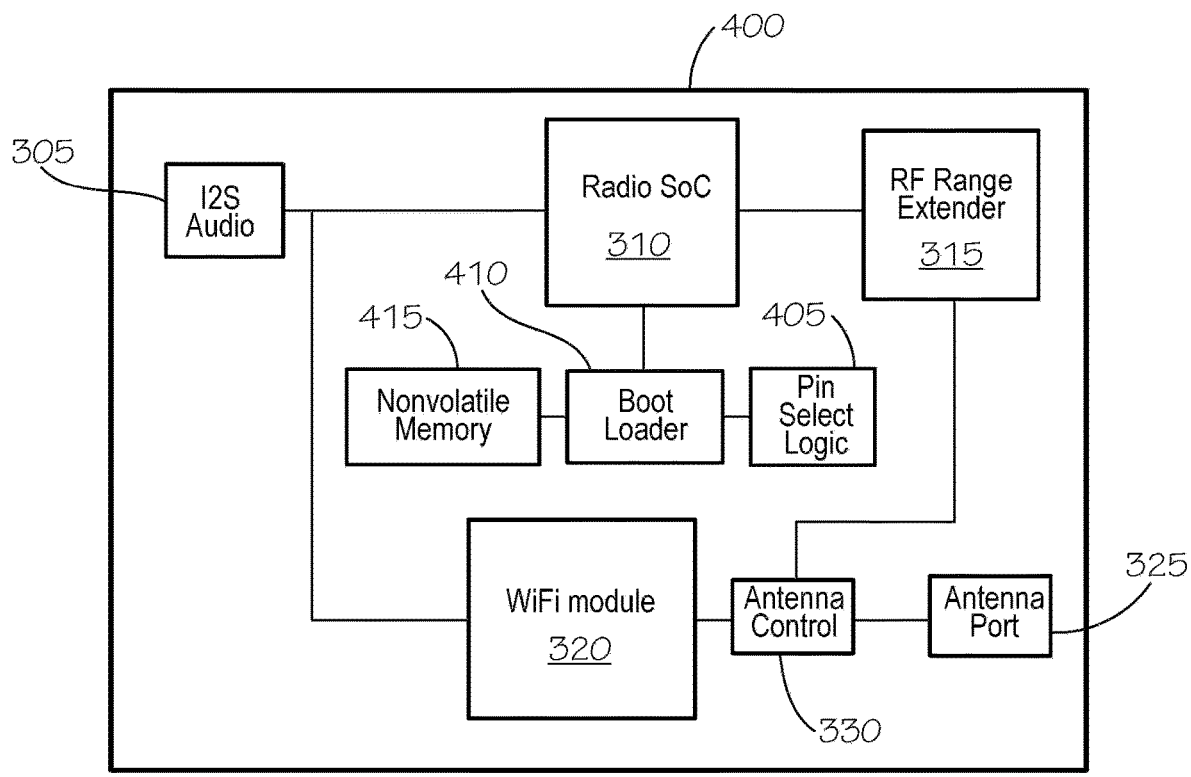
FIG. 4 is a block diagram of a configurable version of the audio integrated circuit of FIG. 3, where the integrated circuit is configured using pin select logic, a boot loader, and non-volatile memory.

FIG. 4 is a block diagram of a configurable version 400 of the audio multi-chip module of FIG. 3, where the multi-chip module 400 is configured using pin select logic 405, a boot loader 410, and non-volatile memory 415 similar to that described above. Once configured at start-up via the boot loader 410, the multi-chip module 400 would operate as described above in conjunction with FIG. 3.

Figure 5:
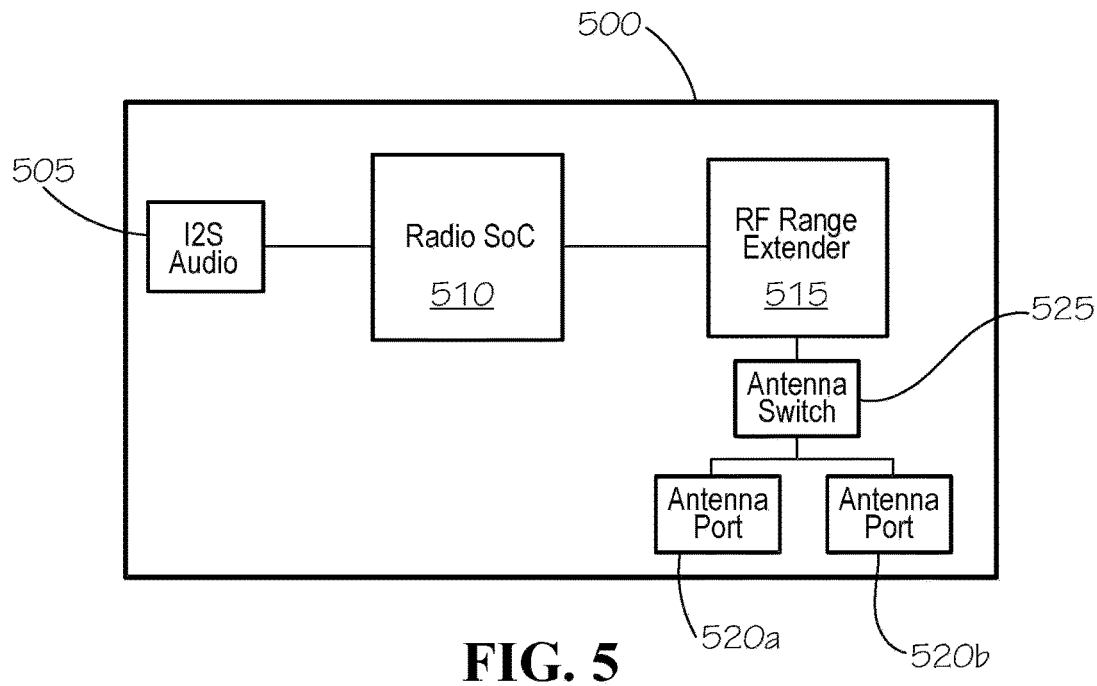
FIG. 5 is a block diagram of an audio integrated circuit for receiving I2S audio and transmitting it wirelessly via one of two antenna ports, or vice versa; i.e., receiving audio wirelessly via one of two antenna ports and making it available as I2S audio.

FIG. 5 is a block diagram of an audio multi-chip module 500 for receiving I2S digital audio and transmitting it wirelessly via one of two antenna ports, or vice versa. The multi-chip module 500 incorporates an I2S digital audio port 505, a radio SoC 510, and RF range extender 515, and multiple antenna ports 520a, 520b, and an antenna switch 525 to select between antenna ports 520a, 520b. When configured in transmit mode, an I2S digital audio signal would be input at the I2S audio port 505, processed by the radio SoC 510, processed by the RF range extender 515, and the resulting RF signal provided to one of the antenna ports 520a, 520b. When configured in receive mode, an RF signal would be received at one of the antenna ports 520a, 520b, processed by the range extender 515, processed by the radio SoC 510, and the resulting I2S digital audio signal provided to the I2S audio port 505.

Figure 6:
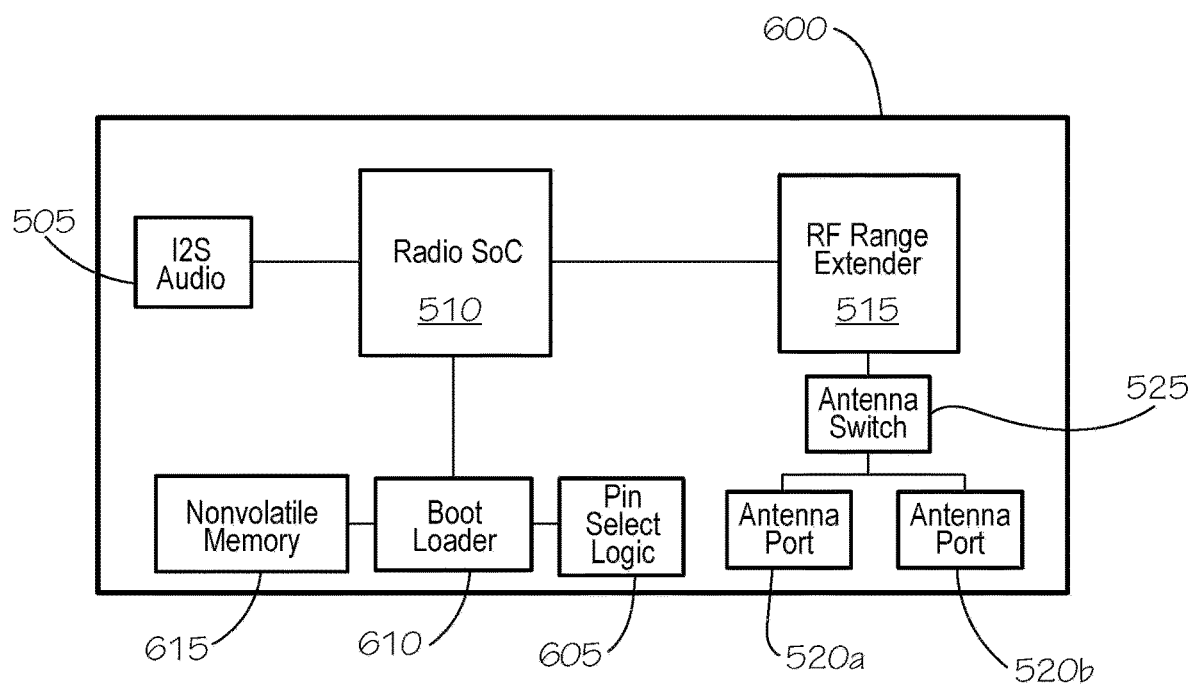
FIG. 6 is a block diagram of a configurable version of the audio integrated circuit of FIG. 5, where the integrated circuit is configured using pin select logic, a boot loader, and non-volatile memory.

FIG. 6 is a block diagram of a configurable version 600 of the audio multi-chip module of FIG. 5, where the multi-chip module 600 is configured using pin select logic 605, a boot loader 610, and non-volatile memory 615 similar to that described above. Once configured at start-up via the boot loader 610, the multi-chip module 600 would operate as described above in conjunction with FIG. 5.

Figure 7:
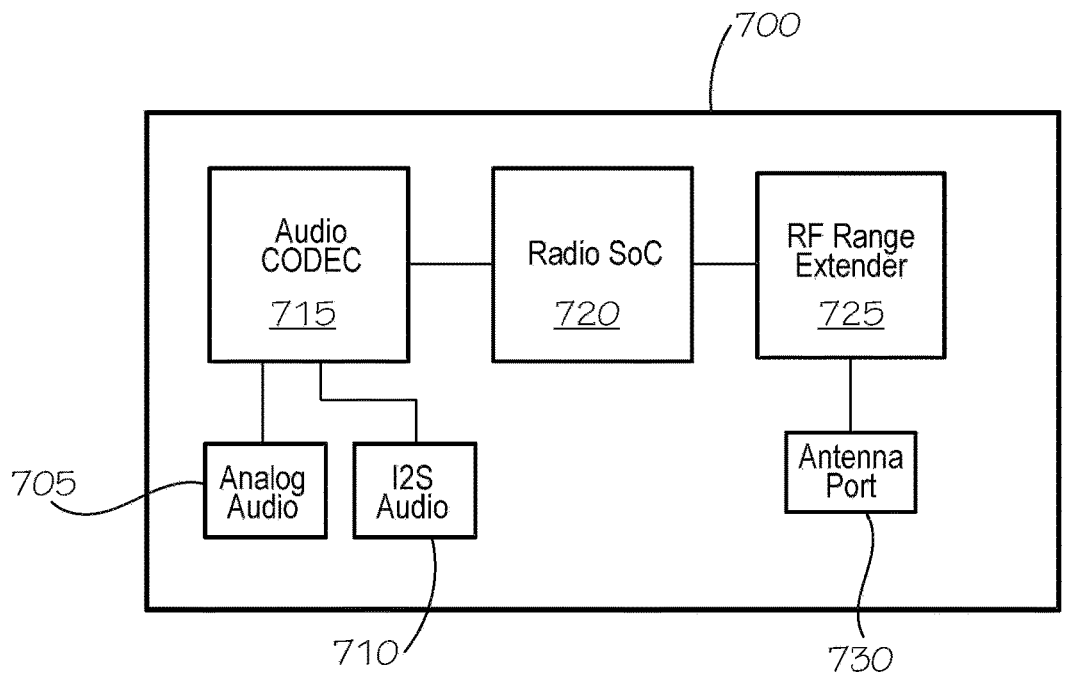
FIG. 7 is a block diagram of an audio integrated circuit for receiving analog audio or I2S audio and transmitting it wirelessly via an antenna port, or vice versa; i.e., receiving audio wirelessly via an antenna port and making it available as I2S audio or analog audio.

FIG. 7 is a block diagram of an audio multi-chip module 700 for receiving analog audio or I2S digital audio and transmitting it wirelessly via an antenna port, or vice versa. The multi-chip module 700 includes an analog audio input 705 and an I2S digital audio input 710, along with an audio codec 715 for encoding or decoding the audio signal. The multi-chip module 700 also includes a radio SoC 720, an RF range extender 725, and an antenna port 730. When configured in transmit mode, an analog audio signal or I2S digital audio signal would be input at the analog audio port 705 or I2S digital audio port 710, respectively. An analog audio signal is encoded by the audio codec 715. The digital audio signal is processed by the radio SoC 720, processed by the RF range extender 725, and the resulting RF signal provided to the antenna port 730. When configured in receive mode, an RF signal would be received at the antenna port 730, processed by the range extender 725, processed by the radio SoC 720, and either provided to the I2S output 710 as a digital signal, or provided to the analog audio output 705 as an analog signal after being processed by the audio codec 715.

Figure 8:
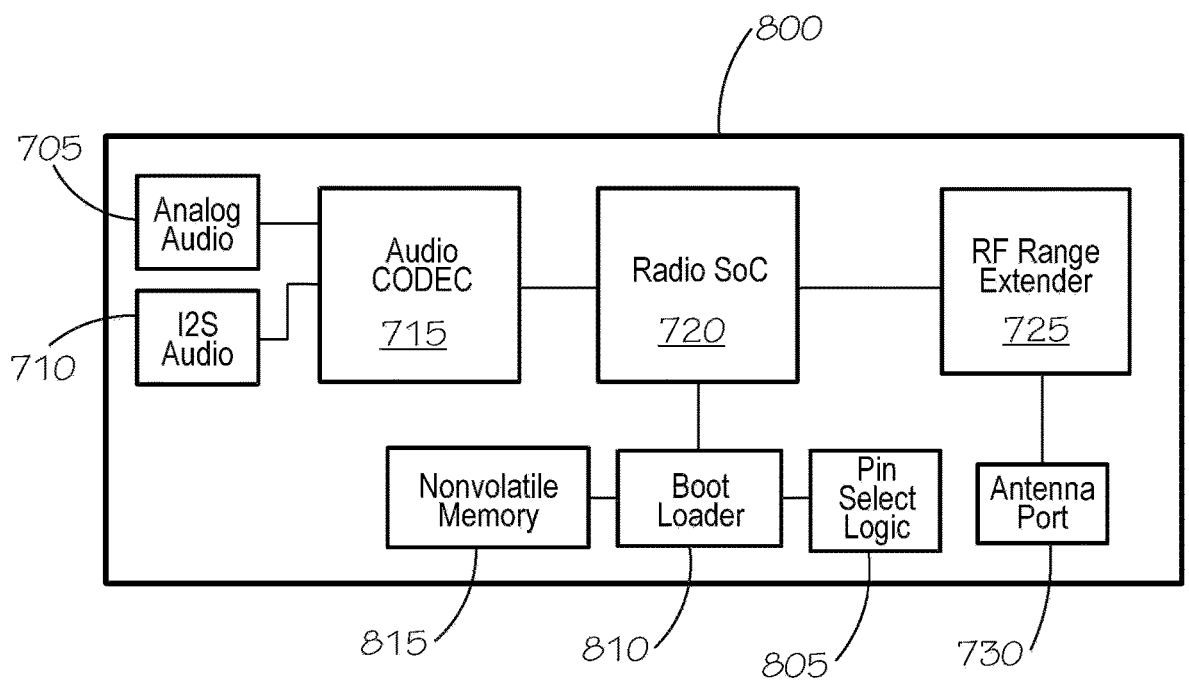
FIG. 8 is a block diagram of a configurable version of the audio integrated circuit of FIG. 7, where the integrated circuit is configured using pin select logic, a boot loader, and non-volatile memory.

FIG. 8 is a block diagram of a configurable version 800 of the audio multi-chip module of FIG. 7, where the multi-chip module 800 is configured using pin select logic 805, a boot loader 810, and non-volatile memory 815 similar to that described above. Once configured at start-up via the boot loader 810, the multi-chip module 800 would operate as described above in conjunction with FIG. 7.

Figure 9:
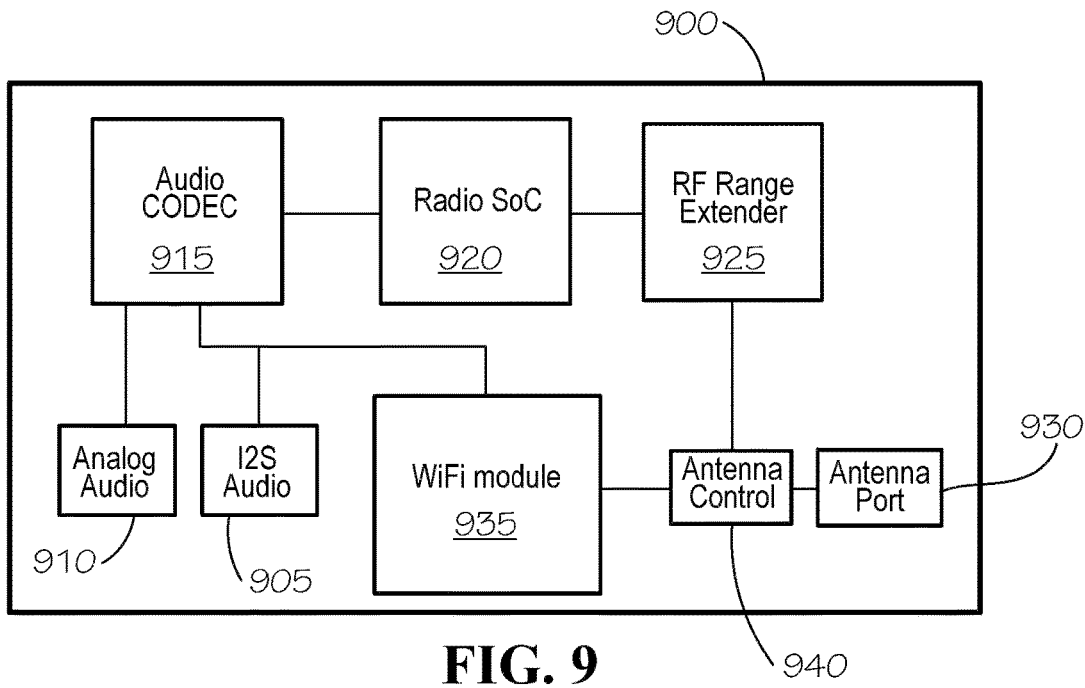
FIG. 9 is a block diagram of an audio integrated circuit for receiving analog audio or I2S audio and transmitting it via one of two wireless networks, or vice versa; i.e., receiving audio via one of two wireless networks and making it available as I2S audio or analog audio.

FIG. 9 is a block diagram of an audio multi-chip module 900 for receiving analog audio or I2S digital audio and transmitting it via one of two wireless networks, or vice versa. Its operation and optional functionality are similar to the combined functions discussed in conjunction with FIGS. 3 and 7 above. Thus, the multi-chip module 900 may receive I2S digital audio at port 905 or analog audio at port 910, which is then converted to digital audio signal by the audio codec 915. If the digital audio is to be transmitted over a proprietary, wireless audio network, the signal will pass through the radio SoC 920 and range extender 925 before being provided to the antenna port 930. If the digital audio is to be transmitted over Wi-Fi, the digital audio signal will pass through the Wi-Fi module 935 before being provided to the antenna port 930. Antenna control 940 which signal path has access to the antenna port 930.

Figure 10:
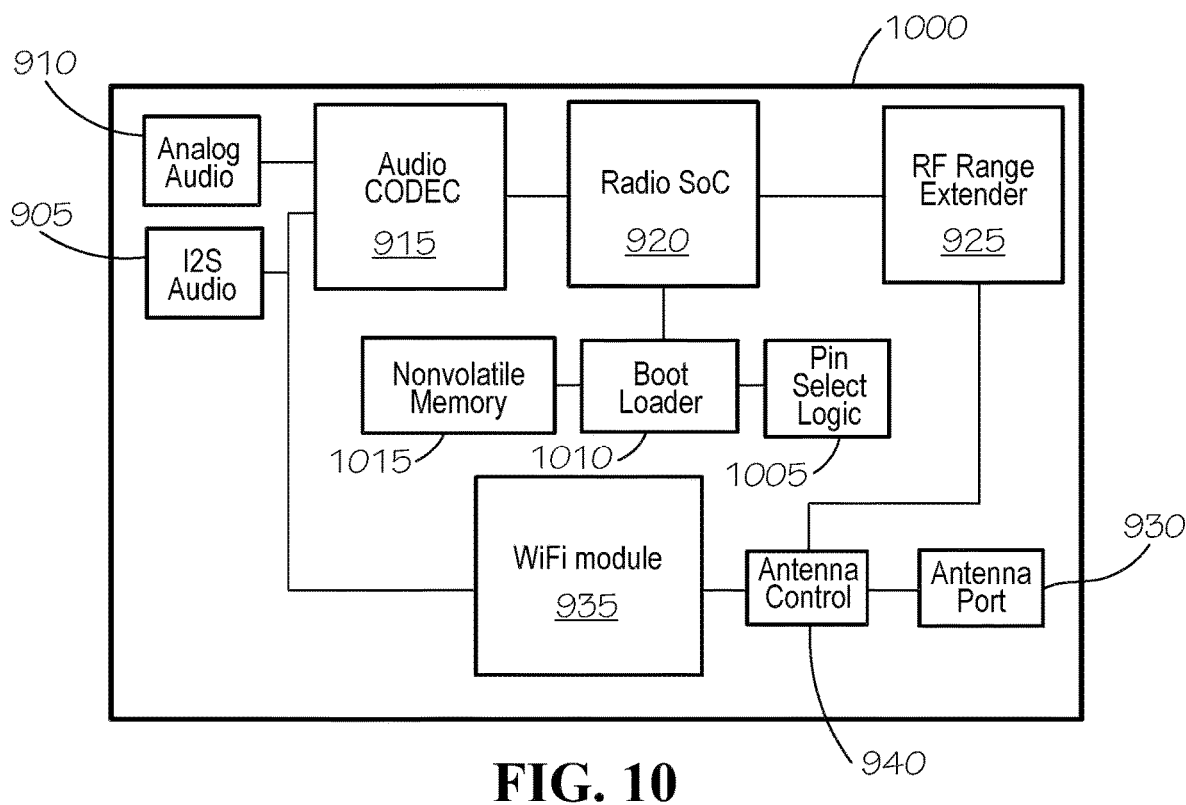
FIG. 10 is a block diagram of a configurable version of the audio integrated circuit of FIG. 9, where the integrated circuit is configured using pin select logic, a boot loader, and non-volatile memory.

FIG. 10 is a block diagram of a configurable version 1000 of the audio multi-chip module of FIG. 9, where the multi-chip module 1000 is configured using pin select logic 1005, a boot loader 1010, and non-volatile memory 1015 similar to that described above. Once configured at start-up via the boot loader 1010, the multi-chip module 1000 would operate as described above in conjunction with FIG. 9.

Figure 11:
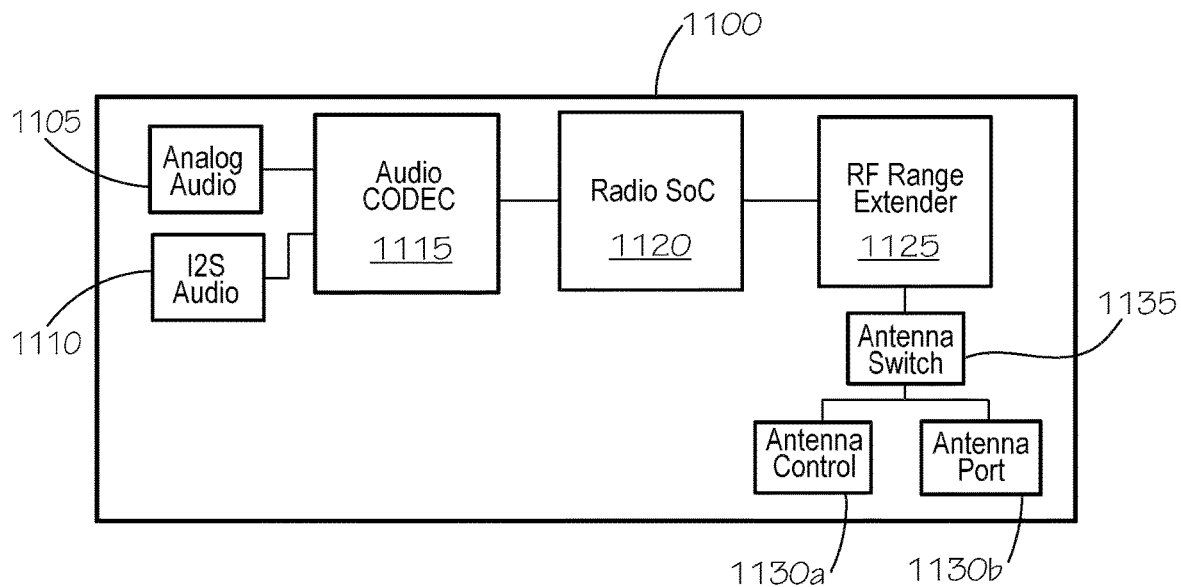
FIG. 11 is a block diagram of an audio integrated circuit for receiving analog audio or I2S audio and transmitting it wirelessly via one of two antenna ports, or vice versa; i.e., receiving audio wirelessly via one of two antenna ports and making it available as I2S audio or analog audio.

FIG. 11 is a block diagram of an audio multi-chip module 1100 for receiving analog audio or I2S digital audio and transmitting it wirelessly via one of two antenna ports 1130a, 1130b, or vice versa. Its operation and optional functionality is similar to the combined functions discussed above in conjunction with FIGS. 5 and 7. Thus, the multi-chip module 1100 may receive analog audio or I2S digital audio via the corresponding ports 1105, 1110, digitize an analog signal via the audio codec 1115, process the digital signal with the radio SoC 1120, process the RF signal with the RF range extender 1125, and provide the RF signal to either of two (or more) antenna ports 1130*a*, 1130*b* via the antenna switch 1135.

Figure 12:
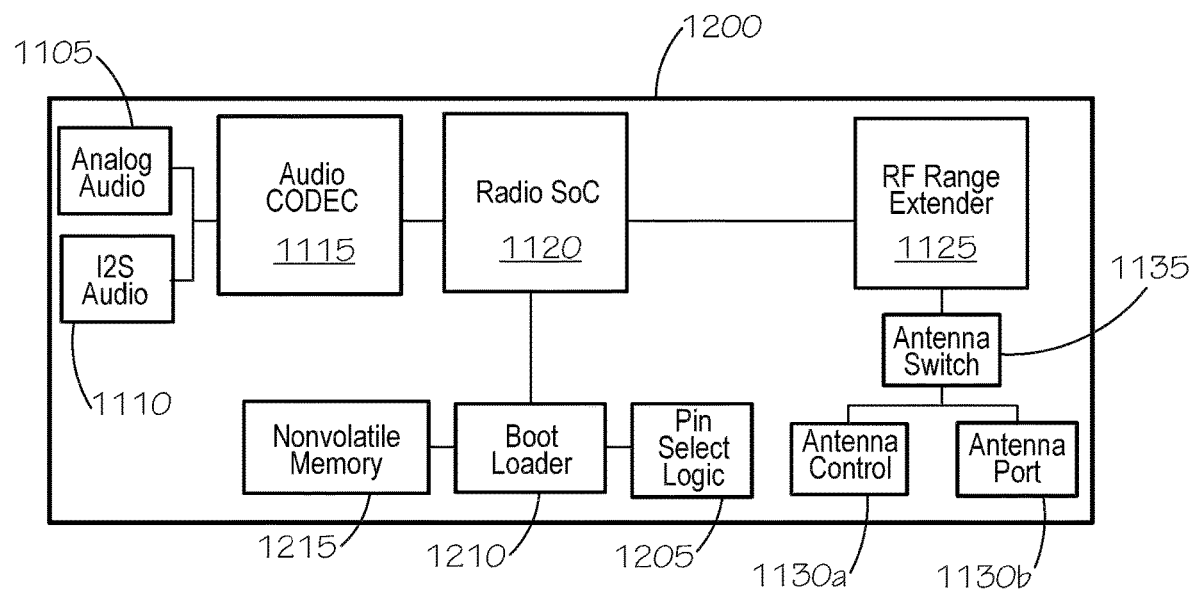
FIG. 12 is a block diagram of a configurable version of the audio integrated circuit of FIG. 11, where the integrated circuit is configured using pin select logic, a boot loader, and non-volatile memory.

FIG. 12 is a block diagram of a configurable version 1200 of the audio multi-chip module of FIG. 11, where the multi-chip module 1200 is configured using pin select logic 1205, a boot loader 1210, and non-volatile memory 1215 similar to that described above. Once configured at start-up via the boot loader 1210, the multi-chip module 1200 would operate as described above in conjunction with FIG. 11.

Figure 13:
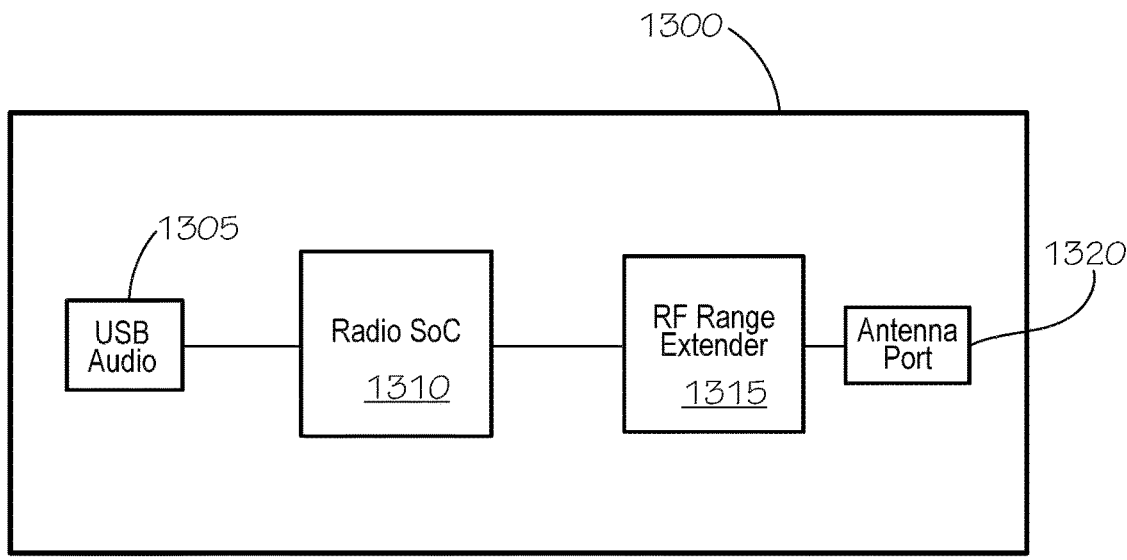
FIG. 13 is a block diagram of an audio integrated circuit for receiving a USB audio signal and transmitting it wirelessly via an antenna port, or vice versa; i.e., receiving audio wirelessly via an antenna port and making it available as a USB audio signal.

FIG. 13 is a block diagram of an audio multi-chip module 1300 for receiving a USB digital audio signal and transmitting it wirelessly via an antenna port 1320. The multi-chip module 1300 incorporates a USB audio input 1305, a radio SoC 1310, and RF range extender 1315, and an antenna port 1320. When configured in transmit mode, a USB audio signal (which is digital) would be input at the USB audio port 1305, processed by the radio SoC 1310, processed by the RF range extender 1315, and the resulting RF signal provided to the antenna port 1320. When configured in receive mode, an RF signal would be received at the antenna port 1320, processed by the range extender 1315, processed by the radio SoC 1310, and the resulting USB audio signal provided to the USB audio port 1305.

Figure 14:
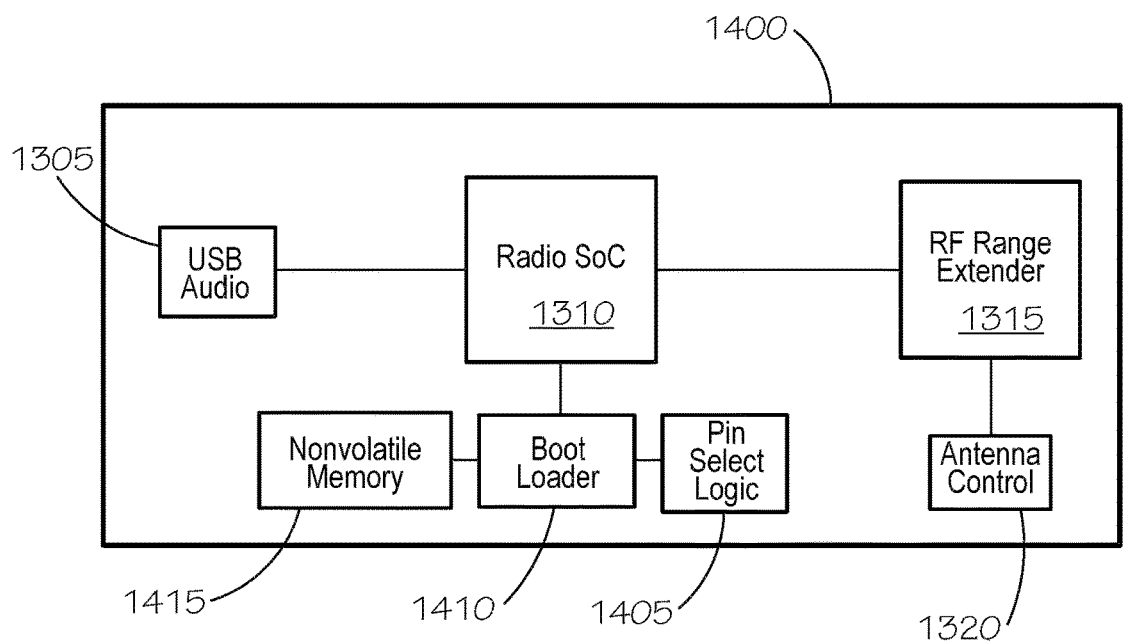
FIG. 14 is a block diagram of a configurable version of the audio integrated circuit of FIG. 13, where the integrated circuit is configured using pin select logic, a boot loader, and non-volatile memory.

FIG. 14 is a block diagram of a configurable version 1400 of the audio multi-chip module of FIG. 13, where the multi-chip module 1400 is configured using pin select logic 1405, a boot loader 1410, and non-volatile memory 1415 similar to that described above. Once configured at start-up via the boot loader 1410, the multi-chip module 1400 would operate as described above in conjunction with FIG. 13.

Figure 15:
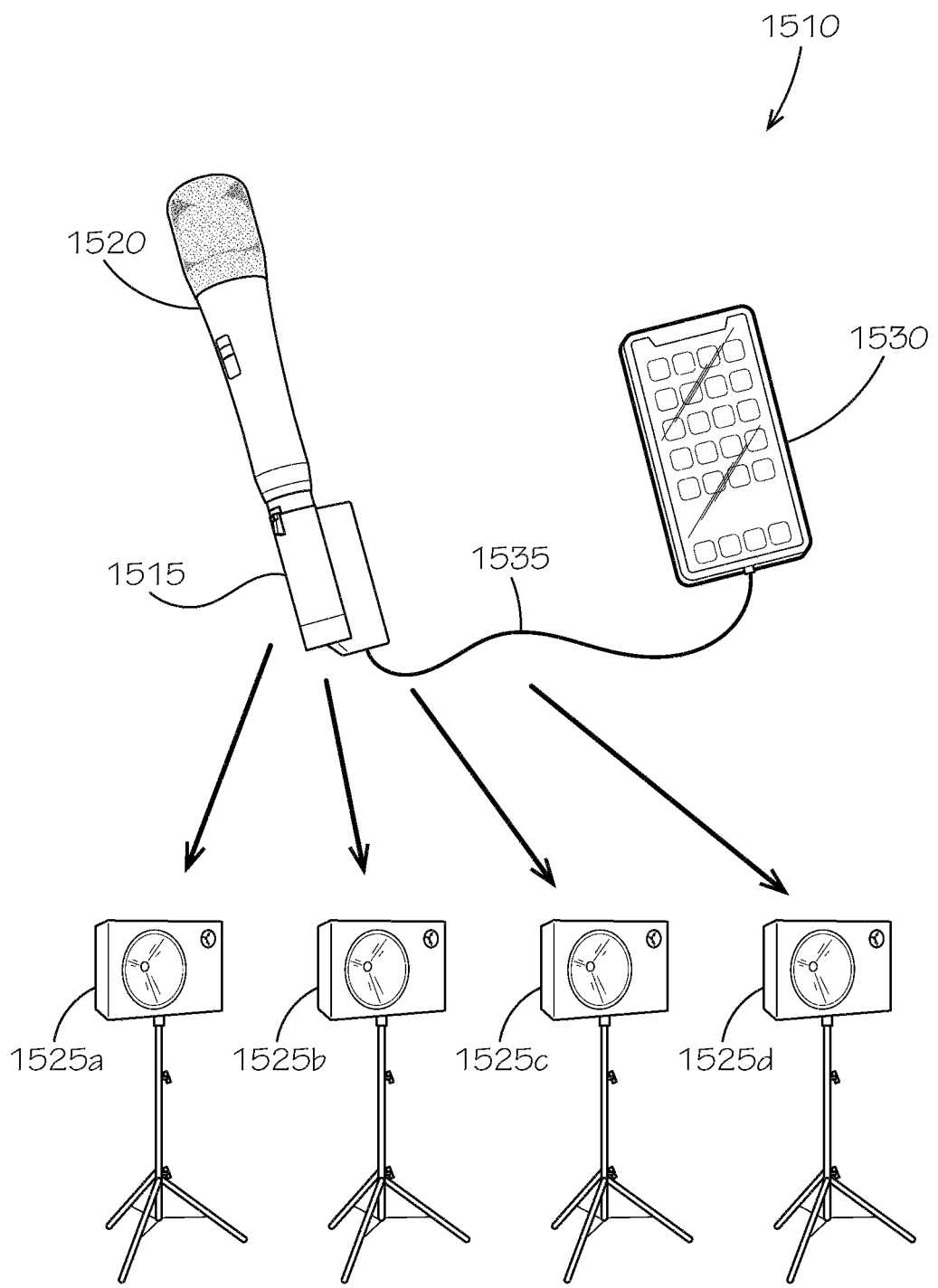
FIG. 15 is a drawing of a wireless audio system using a microphone adapter to combine audio from a microphone and a music source (e.g., a smart phone) and to provide the combined audio output directly to speakers via wireless transmission of digital audio signals.

FIG. 15 illustrates a digital wireless audio system 1510. The digital wireless audio system 1510 uses a microphone adapter 1515 (also shown in FIGS. 16-18) that plugs into a microphone 1520. The microphone adapter 1515 digitizes the analog audio signal from the microphone and wirelessly transmits the digital audio signals directly to speakers 1525*a-d* using the wireless technology described in conjunction with the modules discussed above. Those skilled in the art will appreciate that in order for the speakers 1525*a-d* to receive the digital audio signals from the microphone adapter 1515, the receiver in the speakers must be compatible with the transmitter in the microphone adapter, such as by incorporating modules of the type described above configured in the receive mode.

FIG. 15 also illustrates a feature of the microphone adapter 1515 that allows it to receive audio signals from a smart phone 1530 or other external audio device. The microphone adapter includes an audio jack that allows it to be connected to an audio source. In one embodiment, the microphone adapter 1515 includes a 3.5 mm stereo audio jack, which allows the smart phone 1530 or other audio source to be connected to the microphone adapter and provide stereo analog audio via a common cable 1535. Those skilled in the art will appreciate that some smart phones include a 3.5 mm audio jack for audio out. In the case of smart phones that do not provide a 3.5 mm audio jack, there are adapters that allow the smart phone to be connected to the 3.5 mm jack on the microphone adapter 1515. For example, current versions of Apple's iPhone do not include 3.5 mm audio jacks and provide audio out via a Lightning connector. Apple sells a Lightning to 3.5 mm headphone jack adapter that can be used to allow a simple connection between an iPhone and the microphone adapter 1515. In addition, the port on the microphone adapter 1515 may employ any type of connector that facilitates a connection to an audio source, such as smart phone 1530.

With the microphone 1520 and smart phone 1530 connected to the microphone adapter 1515 in this manner, music from the smart phone 1530 may be combined with vocals from the microphone 1520, with the resulting signal being transmitted to the speakers 1525*a-d*. Thus, the digital wireless audio system 1510 can function as a public address system that allows the host to make announcements or speeches using the microphone 1520 and play music or other recorded audio presentations using the smart phone 1530. Those skilled in the art will recognize that the ability to combine vocals and music allows the digital wireless audio system 1510 to be used as something resembling a karaoke machine.

A user may set up the digital wireless audio system 1510 by attaching microphone adapter 1515 to microphone 1520 via the External Line Return (XLR) connector 1540. If music input is desired, a smart phone 1530 (or other audio source) may be connected to the microphone adapter's 3.5 mm jack 1545 via cable 1535. After the microphone adapter 1515 is powered on, the speaker(s) 1525*a-d* are powered on and placed into "pairing" mode. At that point, the wireless receiver in the speaker(s) 1525*a-d* will detect the transmitter in the microphone adapter 1515 and be paired with it. In one implementation, a single microphone adapter can be paired with up to four receivers or speakers 1525*a-d*. Once the microphone adapter 1515 is paired with the desired speaker(s), the digital wireless audio system 1510 is ready for use and the user may begin speaking into the microphone 1520 or playing music or other audio from the smart phone 1530.

Figure 16:
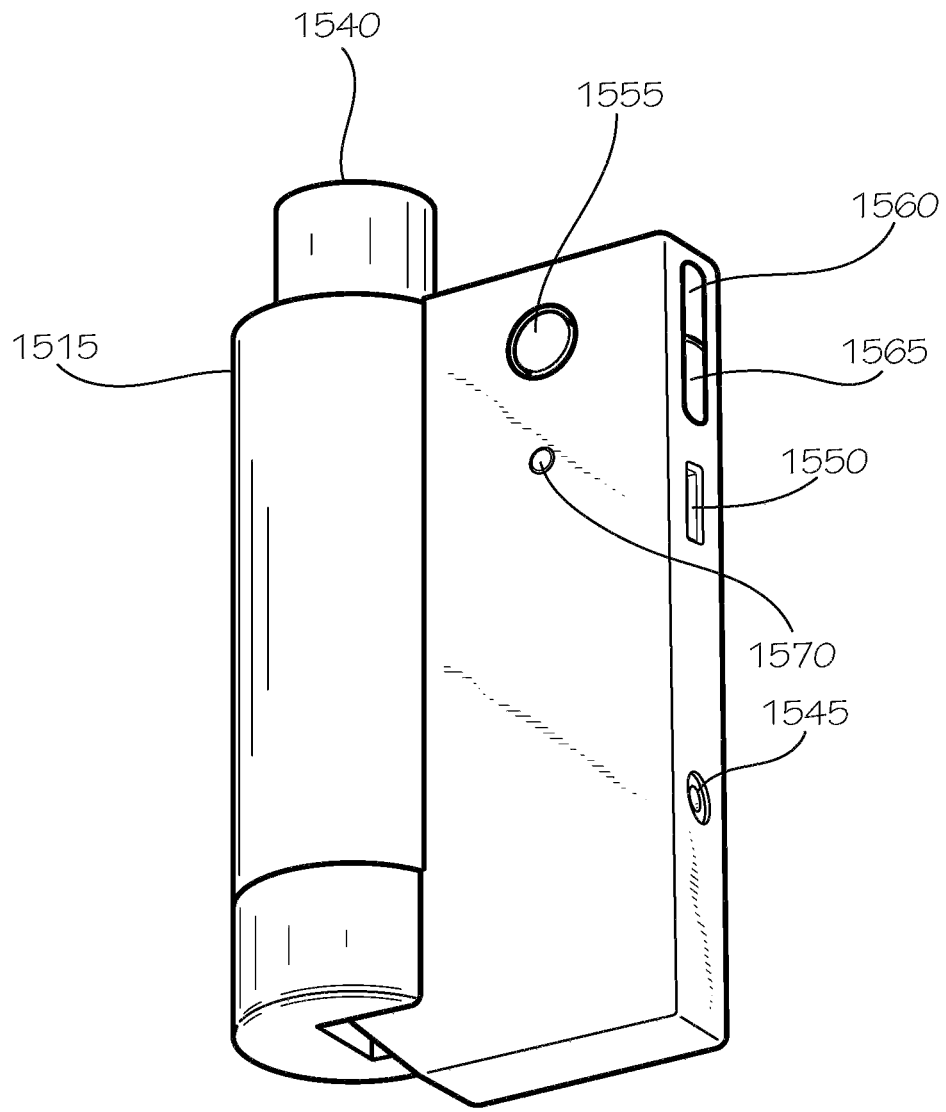
FIG. 16 is a drawing of the microphone adapter shown in FIG. 15.

FIG. 16 is a close up view of the microphone adapter 1515 of FIG. 15 and shows additional features of the device. In this embodiment, the microphone adapter 1515 includes an XLR jack 1540, which is capable of being plugged directly into most handheld microphones used in professional and commercial environments. Those skilled in the art will appreciate that a microphone adapter 1515 could be designed with other types of jacks or connectors, such as mini-XLR, as needed to plug directly into various types of microphones and audio equipment.

FIG. 16 also shows the 3.5 mm audio jack 1545, which is capable of receiving an analog stereo input from the smart phone 1530 (FIG. 15). As with the XLR jack 1540, the 3.5 mm stereo input 1545 can be replaced or supplemented with other types of inputs without departing from the scope of the present disclosure.

Other features include a USB-C connector 1550 for charging an internal battery (not shown) from a wall adapter or other power source (not shown). A power button 1555 serves two functions. When held down for three seconds, it turns the microphone adapter 1515 on or off. When the microphone adapter 1515 is on and the power button 1555 is pressed momentarily, it works to mute/unmute the microphone adapter. Volume up button 1560 and volume down button 1565 allow the user to incrementally increase or decrease the volume with single clicks, or to rapidly maximize or minimize the volume by holding down the appropriate button.

One or more LEDs are used to indicate the status of the microphone adapter 1515. Power/Paired LED 1570 is illuminated with the microphone adapter 1515 is powered on. The Power/Paired LED 1570 may also be used to indicate when the microphone adapter is paired with one or more receivers, such as speakers 1525*a-d* (FIG. 15). The Power/Paired LED 1570 may use a combination of colors, flashing sequences, etc. to indicate a variety of different statuses, such as power on, but not paired or power on and paired to speakers. Alternatively, separate LEDs may be used for power and for pairing status. A low battery LED 1580 (not shown in FIG. 16) informs the user that the battery is low. As with the specific jacks that are included on the microphone adapter 1515, the power connectors, buttons, and LEDs can be changed as desired to provide other types of user interfaces without departing from the scope of the present disclosure.

Figure 17:
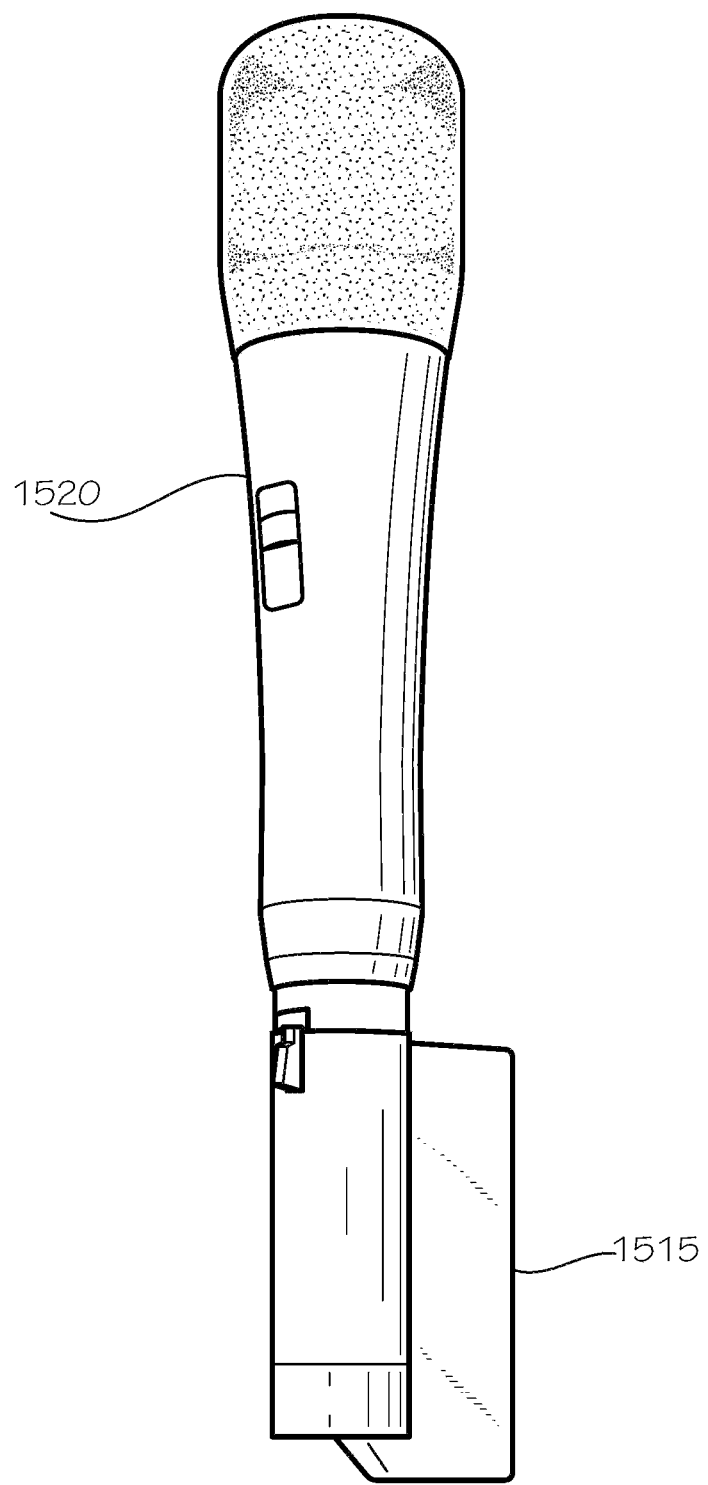
FIG. 17 is a drawing of the microphone adapter attached to the microphone as shown in FIG. 15.

FIG. 17 is another view of the microphone adapter 1515 connected to a microphone 1520, as shown in FIG. 15.

Figure 18:
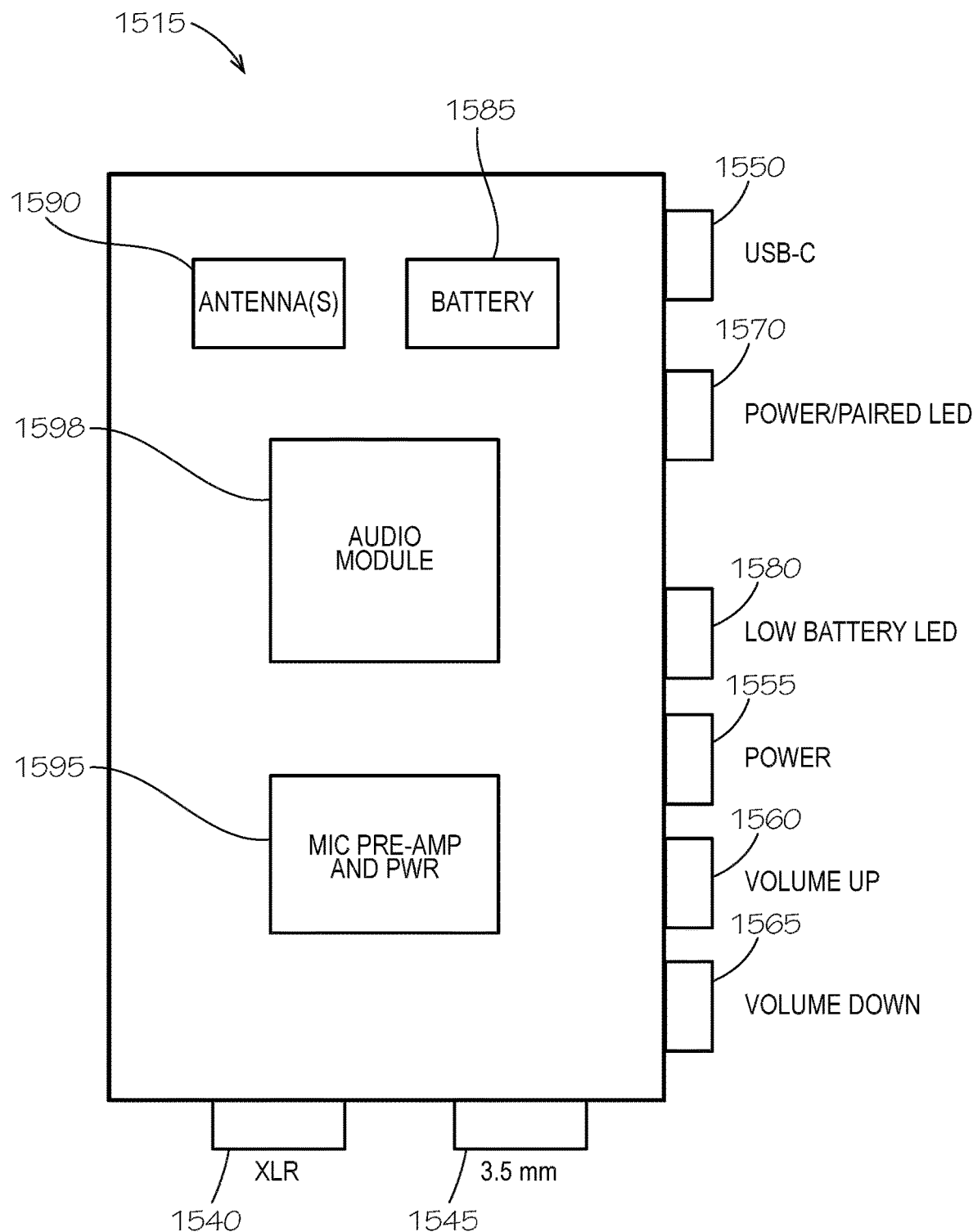
FIG. 18 is a block diagram of the principle elements or features of the microphone adapter shown in FIG. 15.

FIG. 18 is a block diagram illustrating the principle elements or features of the microphone adapter 1515 shown in FIGS. 15-17. Several of the features or components have been mentioned earlier. For example, USB-C connector 1550 is used to charge the rechargeable, internal, lithium-ion battery 1585. As described above, the power button 1555 is used to turn the microphone adapter 1515 on and off or to mute/unmute the microphone adapter, and the volume up button 1560 and volume down button 1565 are used to adjust the volume by adjusting the audio level of the signal transmitted by the microphone adapter 1515.

One or more LEDs are used to provide status information. The Power/Paired LED 1570 is illuminated when the microphone adapter is powered on. The Power/Paired LED 1570 also indicates when the microphone adapter 1515 is paired with one or more compatible receivers, such as speakers 1525*a-d* (shown in FIG. 15). A low battery LED 1580 is illuminated when the power level of the battery 1585 is below a predetermined level.

As discussed above, the microphone adapter 1515 also includes an XLR jack 1540 for connecting to a microphone. The 3.5 mm jack 1545 allows the microphone adapter 1515 to simultaneously receive stereo analog audio input from a smart phone 1530 or other device, such as a tablet, computer, etc.

The microphone adapter 1515 includes one or more internal antennas 1590. The number and type of antennas are chosen based on the frequency and other characteristics of the signal to be transmitted.

The microphone adapter 1515 also provides circuitry for conditioning the audio signal from the microphone. The mic pre-amp 1595 amplifies and conditions the analog audio signal before the signal is provided to the audio codec that forms a part of the audio module 1598. The mic pre-amp circuitry also provides power to FET/condenser-type microphones, which require power. Those skilled in the art will appreciate that dynamic microphones do not require an external power source in order to operate.

The audio module 1598 performs most of the audio conversion and processing functions associated with the microphone adapter 1515. As described above (see FIGS. 7-12 and the associated discussion), the audio module 1598 incorporates circuitry required to convert the analog signals from the microphone 1520 and smart phone 1530 into digital signals that can be further processed and then transmitted to the speakers 1525*a-d* or other receivers. The module may include an audio codec, a radio SoC, and an RF range extender of the type described above. Those skilled in the art will appreciate that the audio module 1598 may be implemented as a multi-chip module of the type described above. Alternatively, the audio module may be implemented using discrete components of the type that form the multi-chip modules described above. In other words, the microphone adapter may include several separate devices, such as an audio codec, radio SoC, RF range extender, and other circuit elements associated with them.

The digital signal processing features of the radio SoC and other elements of the audio module 1598 provide the ability to perform various types of processing on the signals. For example, the audio sample rates may be programmable and the audio word size may be variable. In some embodiments, the audio sample rate may vary from 32,000 to 48,000 bits per second, and the audio word size may be 16 bits or 24 bits. Another useful aspect of this is that the microphone audio and the smart phone audio can be processed separately and differently, both by the audio module 1598 and before the signals reach the audio module 1598. For example, the microphone signal path can include its own processing (or preprocessing) circuitry, which can include a microphone preamplifier, programmable gain stage, programmable tone filters, and other circuitry for preprocessing an analog audio signal. Similarly, the 3.5 mm signal path, which can receive and process a line level analog audio input in some embodiments, can include its own processing (or preprocessing) circuitry. This processing circuitry can include a programmable gain stage, programmable tone filters, and programmable DC offset correction circuitry, and other circuitry for preprocessing an analog audio signal.

Another option is that the microphone signal and the smart phone signal are each transmitted as their own digitized channel. Although these are separate digitized channels, they may be combined and transmitted in a modulated radio frequency (RF) signal that includes a single, multiplexed digital data stream that includes the microphone channel and the smart phone/music channel (i.e., a modulated digital audio signal). Keeping these two channels separate during transmission allows more flexibility at the receiver. Though they will probably be played together if the receiver is a loudspeaker, there are scenarios where the receiver could be connected to a computer or audio console, where more sophisticated, separate processing of the different channels would be possible.

Those skilled in the art will appreciate that the Audality™ wireless microphone transmitter incorporates the patented WiC™ technology with its built-in audio digital signal processing capabilities, enabling independent frequency corrections/adjustments for both the microphone channel and the music/audio channel. This unique ability enables the wireless microphone transmitter to support a wide variety of microphones.

Another feature found in the microphone adapter is that it is capable of connecting to several receivers at the same time. This is a vast advantage over Bluetooth and other digital music transmission schemes. In the present disclosure, the microphone adapter can connect to as many as four speakers simultaneously. This allows the digital wireless audio system 1510 to easily be set up and used in a conference room, auditorium, sanctuary, or outdoor venue where more than one speaker is required to fill the room.

Another feature of the microphone adapter is the frequency hopping scheme that is implemented in it. This allows the transmitters and associated receivers to monitor the quality of various channels and select those that provide the best signal quality. If the signal quality changes, the system can stop using the poor-performing channels and utilize others in this frequency hopping scheme. Another advantage of frequency hopping is that it provides a level of security since the transmissions are not consistently transmitted on the same channel or frequency.

Those skilled in the art will appreciate that the features of the present microphone adapter enable a convenient and robust digital wireless audio system of the type illustrated in FIG. 15. Such a system allows users to easily set up a "pop-up" public address system for use with meetings, speeches, presentations, concerts, sporting events, etc.

Where battery-powered speakers are available, the entire system can be set up without any power cords or audio cables, which is a tremendous advantage over conventional portable public address systems.

Those skilled in the art will appreciate that the features of the microphone adapter, and the audio modules used in it, may be configured to provide the following features and advantages, including creating portable wireless audio products that feature a dedicated wireless network, 24-bit uncompressed HD audio, ranges up to 500 feet, and point-to-multipoint transmission (i.e., one transmitter to multiple speakers, receivers, headphones, etc.).

Although several aspects have been disclosed in the foregoing specification, it is understood by those skilled in the art that many modifications and other aspects will come to mind to which this disclosure pertains, having the benefit of the teaching presented in the foregoing description and associated drawings. It is thus understood that the disclosure is not limited to the specific aspects disclosed hereinabove, and that many modifications and other aspects are intended to be included within the scope of any claims that can recite the disclosed subject matter.

The logical operations, functions, or steps described herein as part of a method, process or routine may be implemented (1) as a sequence of processor-implemented acts, software modules, or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, can be executed out of order from that shown or discussed, including substantially concurrently or in reverse order, depending on the functionality involved, as would be understood by those reasonably skilled in the art of the present disclosure. Many variations and modifications can be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A microphone adapter for a wireless audio system, comprising:
    first External Line Return (XLR) connector for connecting directly to a second XLR connector on a microphone and for receiving a first analog audio signal from the microphone;
    a third connector for connecting to an audio source and for receiving a second analog audio signal from the audio source;
    first processing circuitry for preprocessing the first analog audio signal and providing a first preprocessed analog audio signal, the first processing circuitry comprising at least one of a preamplifier, a gain stage, and a tone filter;
    second processing circuitry for preprocessing the second analog audio signal and providing a second preprocessed analog audio signal, the second processing circuitry comprising at least one of a gain stage, a tone filter, and direct current (DC) offset correction circuitry;
    an audio module for receiving and processing the first preprocessed analog audio signal and the second preprocessed analog audio signal and for providing a modulated digital audio signal corresponding to the first preprocessed analog audio signal and the second preprocessed analog audio signal, the audio module comprising an audio codec for converting the first preprocessed analog audio signal and the second preprocessed analog audio signal to digital audio signals and a radio system on a chip (SoC) for modulating the digital audio signals and providing the modulated digital audio signal; and
    an antenna for transmitting the modulated digital audio signal.

2. The microphone adapter of claim 1, wherein the modulated digital audio signal comprises a multiplexed digital data stream.

3. The microphone adapter of claim 2, wherein the multiplexed digital data stream comprises a first digital channel corresponding to the first preprocessed analog audio signal and a second digital channel corresponding to the second preprocessed analog audio signal.

4. The microphone adapter of claim 3, wherein the second digital channel corresponds to a stereo audio signal.

5. The microphone adapter of claim 1, wherein the audio module further comprises a radio frequency (RF) range extender for amplifying the modulated digital audio signal prior to transmission from the antenna.

6. The microphone adapter of claim 1, wherein the third connector is a 3.5 mm stereo audio jack.

7. A portable wireless audio system, comprising:
    a microphone having a first External Line Return (XLR) connector;
    at least one speaker; and
    a microphone adapter connected to the first XLR connector and configured to receive and process an analog audio signal from the microphone and transmit a modulated digital audio signal to the at least one speaker, wherein the microphone adapter comprises:
- a second XLR connector for connecting directly to the first XLR connector on the microphone and for receiving a first analog audio signal from the microphone;
- first processing circuitry for preprocessing the first analog audio signal and providing a first preprocessed analog audio signal, the first processing circuitry comprising at least one of a preamplifier, a gain stage, and a tone filter;
- an audio module configured to receive and process the first preprocessed analog audio signal and to provide a modulated digital audio signal corresponding to the first preprocessed analog audio signal, the audio module comprising an audio codec for converting the first preprocessed analog audio signal to a digital audio signal and a radio system on a chip (SoC) for modulating the digital audio signal and providing the modulated digital audio signal; and
- an antenna for transmitting the modulated digital audio signal.

8. The portable wireless audio system of claim 7, wherein the microphone adapter further comprises:
- a third connector for connecting to an audio source and for receiving a second analog audio signal from the audio source; and
- second processing circuitry for preprocessing the second analog audio signal and providing a second preprocessed analog audio signal, the second processing circuitry comprising at least one of a gain stage, a tone filter, and direct current (DC) offset correction circuitry,
- and wherein the audio module is further configured to receive and process the second analog audio signal and the modulated digital audio signal corresponds to the first preprocessed analog audio signal and the second preprocessed analog audio signal.

9. The portable wireless audio system of claim 8, wherein the modulated digital audio signal comprises a multiplexed digital data stream.

10. The portable wireless audio system of claim 9, wherein the multiplexed digital data stream comprises a first digital channel corresponding to the first preprocessed analog audio signal and a second digital channel corresponding to the second preprocessed analog audio signal.

11. A method for transmitting wireless audio signals to a speaker, comprising the steps of:
- receiving a first analog audio signal from a microphone;
- receiving a second analog audio signal from an audio source;
- preprocessing the first analog audio signal and providing a first preprocessed analog audio signal by applying at least one of a preamplifier, a gain stage, and a tone filter to the first analog audio signal;
- preprocessing the second analog audio signal and providing a second preprocessed analog audio signal by applying at least one of a gain stage, a tone filter, and a direct current (DC) offset to the second analog audio signal;
- converting the first preprocessed analog audio signal and the second preprocessed analog audio signal into a modulated digital audio signal that includes a multiplexed digital data stream; and
- amplifying the modulated digital audio signal prior to transmission to a speaker,
- wherein converting the first preprocessed analog audio signal and the second preprocessed analog audio signal comprises digitizing the first preprocessed analog audio signal to provide a first digital audio signal and converting the second preprocessed analog audio signal to provide a second digital audio signal and modulating the first and second digital audio signals to provide the modulated digital audio signal.

12. The method of claim 11, wherein the multiplexed digital data stream comprises a first digital channel corresponding to the first preprocessed analog audio signal and a second digital channel corresponding to the second preprocessed analog audio signal.

13. The method of claim 12, wherein the second digital channel corresponds to a stereo audio signal.

* * * * *